US007628690B2

(12) United States Patent
Englman et al.

(10) Patent No.: US 7,628,690 B2
(45) Date of Patent: Dec. 8, 2009

(54) GAMING MACHINE WITH SELECTION FEATURE

(75) Inventors: Allon G. Englman, Chicago, IL (US); Michael W. Mastropietro, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 701 days.

(21) Appl. No.: 10/778,574

(22) Filed: Feb. 13, 2004

(65) Prior Publication Data

US 2005/0181855 A1 Aug. 18, 2005

(51) Int. Cl.
*A63F 9/24* (2006.01)
*A63F 13/10* (2006.01)

(52) U.S. Cl. ............................ 463/17; 463/16; 463/30; 463/31

(58) Field of Classification Search ................ 273/139, 273/143 R; 463/16, 20, 25, 30, 31, 43
See application file for complete search history.

(56) References Cited

U.S. PATENT DOCUMENTS 6,190,255 B1 * 2/2001 Thomas et al. ................ 463/20
6,287,197 B1 * 9/2001 Dickinson et al. ............ 463/31
6,315,660 B1 11/2001 DeMar et al. ................. 463/16
6,346,043 B1 * 2/2002 Colin et al. .................... 463/17
6,347,996 B1 2/2002 Gilmore et al. ............... 463/17
6,443,837 B1 9/2002 Jaffe et al. ..................... 463/16
6,592,457 B1 7/2003 Frohm et al. .................. 463/16
6,607,437 B2 8/2003 Casey et al. .................... 463/16
6,669,559 B1 * 12/2003 Baerlocher et al. ............ 463/16
6,685,560 B1 2/2004 Hughes ........................ 463/16
6,935,947 B1 * 8/2005 Singer et al. .................. 463/16
6,964,416 B2 * 11/2005 McClintic et al. ........... 273/273
2003/0125106 A1 7/2003 Baerlocher et al.
2003/0153378 A1 8/2003 Schlegel et al.

FOREIGN PATENT DOCUMENTS

GB 2385701 A 8/2003

OTHER PUBLICATIONS

Search Report dated Jun. 9, 2003 for Application No. GN 0500803.2.

* cited by examiner

*Primary Examiner*—Dmitry Suhol
*Assistant Examiner*—Victor Cheung
(74) *Attorney, Agent, or Firm*—Nixon Peabody LLP

(57) ABSTRACT

A method and apparatus for allowing additional selections of predefined objects during a wagering game is disclosed. In one embodiment, at the onset of the game, a fixed number of selections and selectable objects is defined by the game and is presented to the player. Each selectable object has identifiable similarities or identical characteristics with at least one other object creating the potential of selecting matched sets. If a matched set is selected within the predetermined allowed number of selections, the matched set is removed from the selected group of objects. A number identical to the number of objects in the matched set is added to the available selections count. This method gives more control to the player and provides another element to the wagering game by adding the possibility of additional selections to the possibility of other awards.

29 Claims, 14 Drawing Sheets

GAMING MACHINE WITH SELECTION FEATURE

FIELD OF THE INVENTION

The present invention relates generally to gaming machines and, more particularly, to a slot machine including a selection feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by increasing the entertainment value and excitement for the player.

One concept originally employed to increase the entertainment value of a reel spinning game is a bonus round, providing the player with a different game experience occurring randomly during play of the basic game. Typically, a predetermined set of symbols on the basic reel game triggers a bonus round. Bonus games take on a variety of themes and in many cases require the player to make choices that typically instill a feeling of control or self-destiny.

A concept often found in bonus games today is the selection of animated characters or objects that potentially provide the player with a winning outcome. In many cases, the selection results in immediate feedback to the player of an award, a loss, or the completion of the bonus round. Another example of this concept is the requirement or ability to match objects or characters to realize or enhance a winning outcome, or, in some cases, to end the bonus game. Typically, this involves choosing an object or character to reveal a particular characteristic, then attempting to choose (or avoid) another object with identical or similar characteristics to create a matched set. Often times this type of bonus selection is ended when an object is chosen to reveal a bonus ending symbol or result. Bonus selections can also take the form of a simple quota or maximum quantity. When the player selects the maximum number of allowed choices, the bonus round ends and the player is returned to the basic slot game.

An alternative to the matching concept and the maximum number of objects chosen would increase the entertainment value of the bonus game and increase the feeling of control for the player.

SUMMARY OF THE INVENTION

In one embodiment, the present invention provides a method of conducting a wagering game, comprising displaying a plurality of selectable elements and selecting a fixed number of the selectable elements. If the selected elements form a predefined set, the game awards an additional number of selections of the selectable elements. The game provides an award based on the selected elements. An apparatus for conducting the wagering game is also disclosed.

In another embodiment, a medium is encoded with a program for implementing a method. The program directs a device to perform the steps of displaying a plurality of selectable elements and selecting a fixed number of the selectable elements. The program further directs the device to perform the steps of awarding an additional number of selections of the selectable elements if the selected elements form a predefined set and providing an award based on the selected elements.

BRIEF DESCRIPTION OF THE DRAWINGS

The foregoing and other advantages of the invention will become apparent upon reading the following detailed description and upon reference to the drawings in which.

Figure 1:
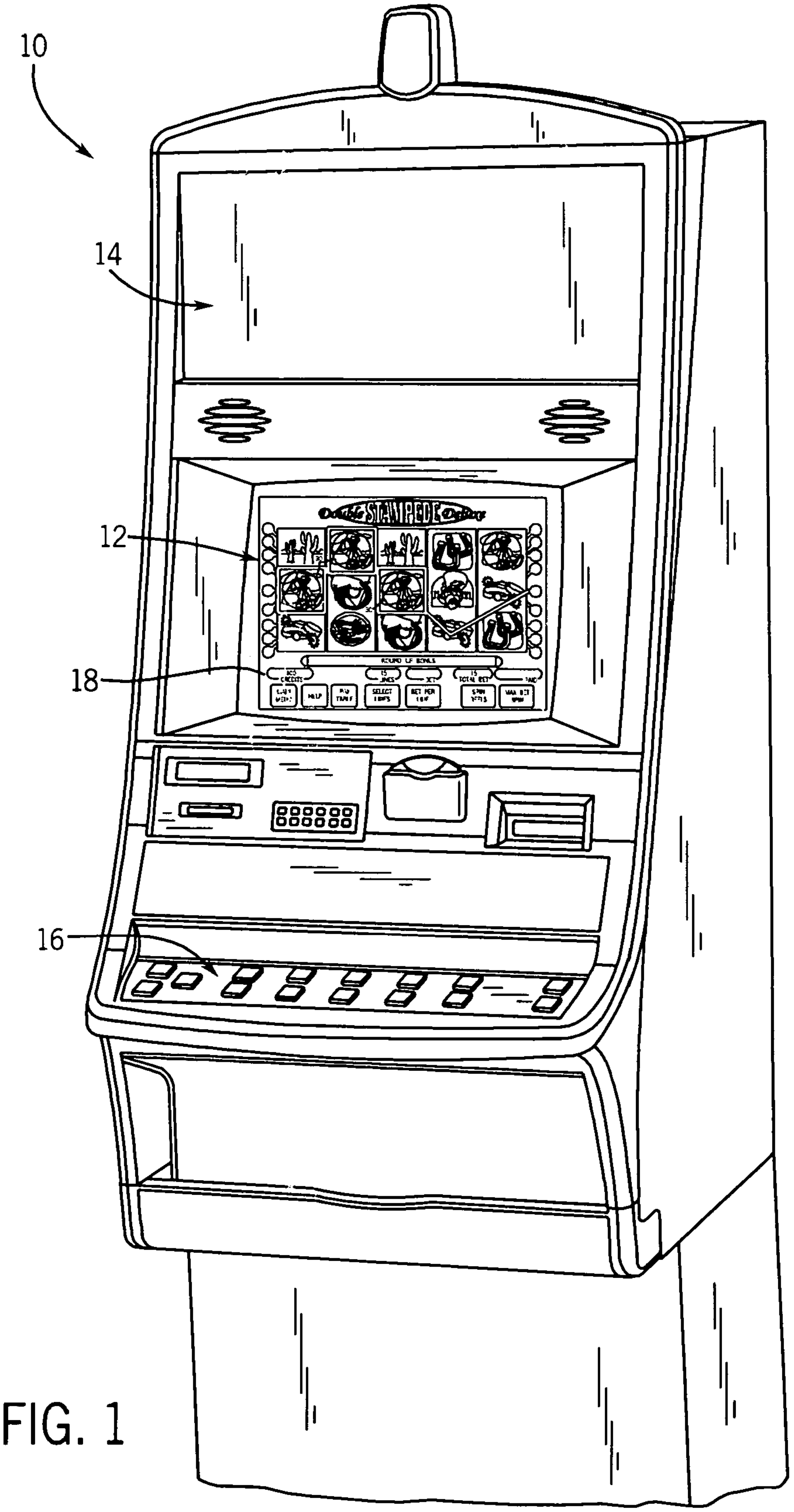
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

FIG. 1 depicts a gaming machine 10 operable to conduct a video reel slot game. In operation, the gaming machine receives a wager from a player to purchase a "play" of the game. In a "play" of the game, the gaming machine generates at least one random event using a random number generator and provides an award to the player for a winning outcome of the random event. To portray the random event and outcome to the player, the gaming machine includes a video display 12. For a video reel slot game, the video display 12 portrays a plurality of simulated reels that are rotated and stopped to place symbols on the reels in visual association with one or more pay lines.

The video display 12 is preferably in the form of a liquid crystal display (LCD), cathode ray tube (CRT), plasma, or other type of video display known in the art. The display 12 preferably includes a touch screen 18 overlaying the monitor. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10. In addition to the display 12, the gaming machine 10 may include a secondary display 14 for displaying additional game information such as a bonus feature. The game may be operated by the touch screen 18 or by a button panel 16.

Figure 2:
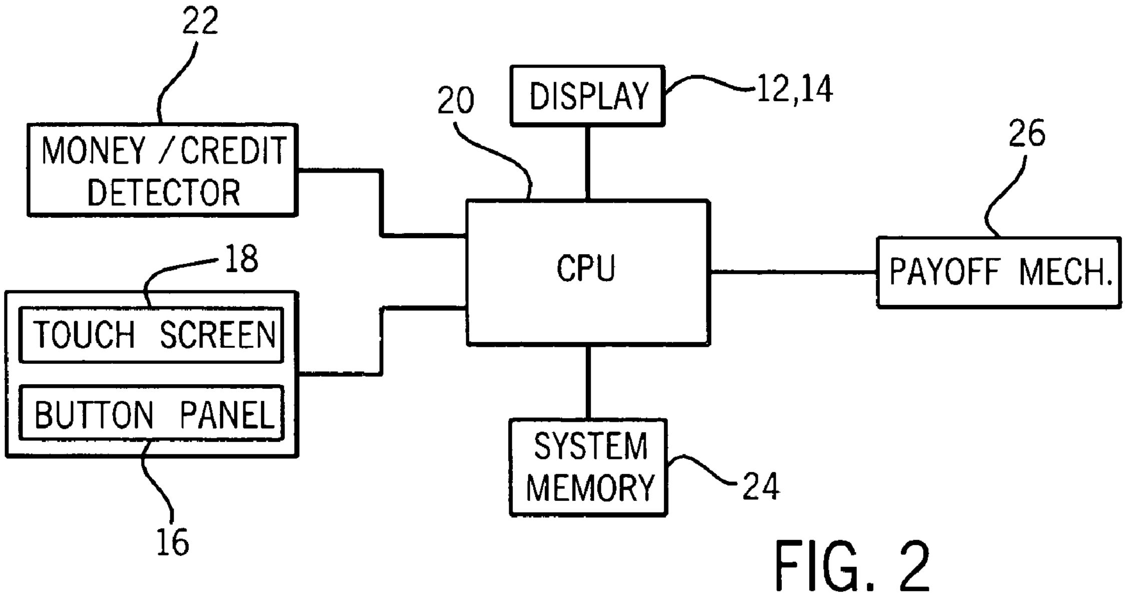
FIG. 2 is a block diagram of a control mechanism used for communication between interface components, a main processor, and display units.

FIG. 2 is a block diagram of a control system suitable for operating the gaming machine. Money/credit detector 22 signals a central processing unit (CPU) 20 when a player has inserted money or played a number of credits. The money may be provided by coins, bills, tickets, coupons, cards, etc. Using a button panel 16 and/or the touch screen 18, the player may select any variables associated with the wagering game and place his/her wager to purchase a play of the game. In a play of the game, the CPU 20 generates at least one random event using the random number generator and provides an award to the player for a winning outcome of the random event. Alternatively, the random event may be generated by a remote computer using an RNG or pooling schema and then transmitted to the gaming machine. The CPU 20 operates the display 12 to represent the random event(s) and outcome(s) in a visual form that can be understood by the player. In addition to the CPU 20, the control system may include one or more additional slave control units for operating one or more of the displays 12 and 14.

System memory 24 stores control software, operational instructions and data associated with the gaming machine. In one embodiment, the system memory 24 comprises a separate read-only memory (ROM) and battery-backed random-access memory (RAM). However, it will be appreciated that the system memory 24 may be implemented on any of several alternative types of memory structures or may be implemented on a single memory structure. A payoff mechanism 26 is operable in response to instructions from the CPU 20 to award a payoff to the player. The payoff may, for example, be in the form of a number of credits. The number of credits is determined by one or more math tables stored in the system memory 24.

Referring back to FIG. 1, to play the reel slot game, a player selects a number of pay lines and places a wager on the selected lines using the button panel 16 and/or the touch screen 18. In response to pressing a "Spin Reels" button, the CPU spins and randomly stops the plurality of simulated reels on the display 12 to place symbols on the reels in visual association with the pay lines. Other mechanisms, such as a handle, may be used to set the reels in motion. The number of reels and pay lines may be varied to be more or less than what is illustrated. The CPU 20 uses the random number generator to select a game outcome (e.g., "basic" game outcome) corresponding to a particular set of reel "stop positions." The CPU 20 then causes each of the reels to stop at the appropriate stop position. Symbols are displayed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. The pay table may be affixed to the machine 10 and/or displayed by the display 12 in response to a command by the player (e.g., by pressing a "Pay Table" key). A winning basic game outcome occurs when the symbols appearing on the reels along a pay line correspond to one of the winning combinations on the pay table. A winning combination, for example, could be a number of matching symbols along an active pay line, where the award is greater as the number of matching symbols along the pay line increases. If the displayed symbols stop in a winning combination, the game credits the player an amount corresponding to the award in the pay table for that combination multiplied by the number of credits wagered on the active pay line. The player may collect the amount of accumulated credits by pressing a "Collect" key.

Figure 3:
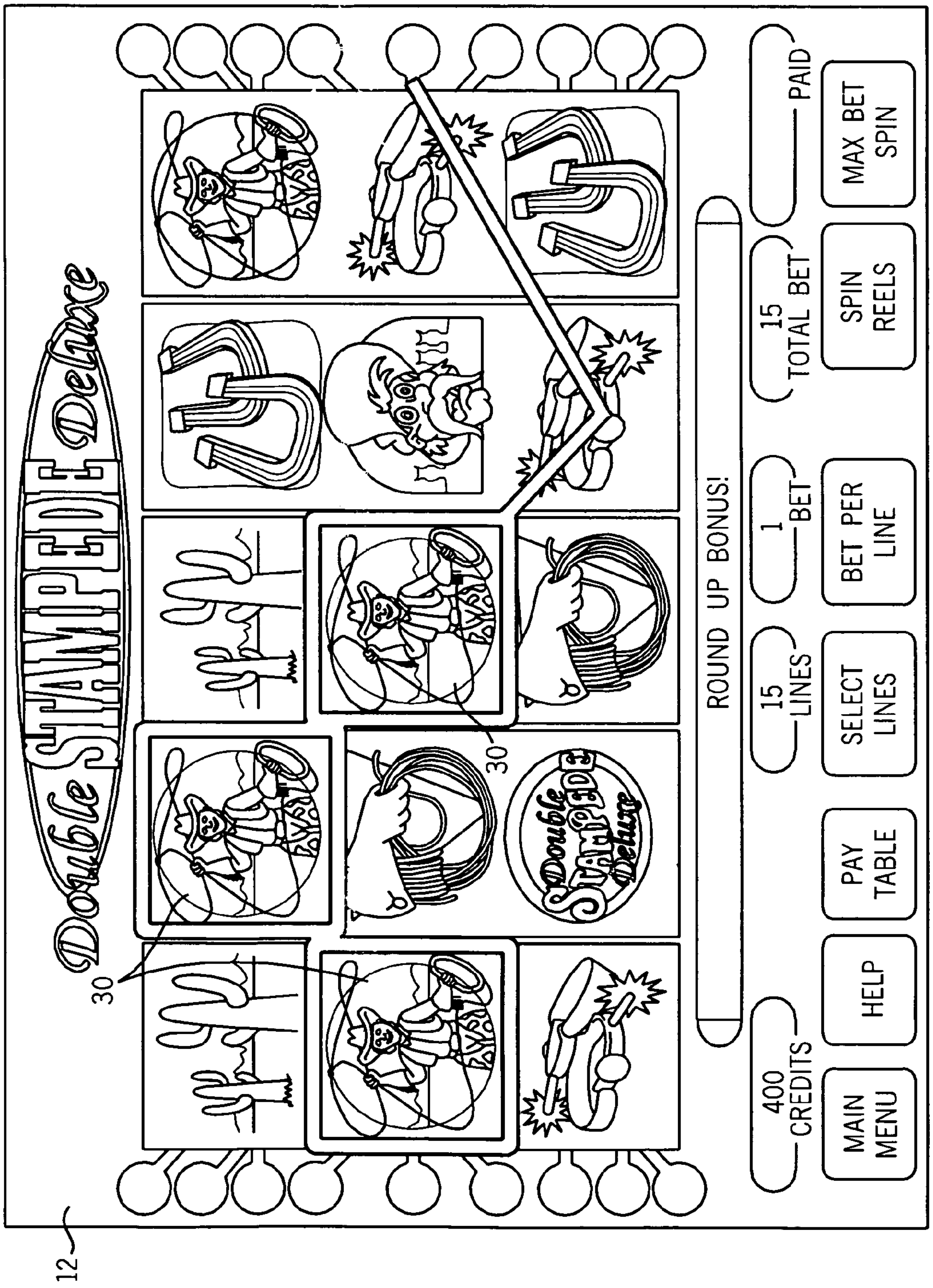
FIG. 3 is a display image associated with a basic slot game and showing a symbol combination for triggering a bonus feature.

The present invention provides a feature allowing the player to collect sets of objects or animated characters during a bonus round and to continue bonus play until all sets have been collected or the allowable number of selections has been exhausted. In the following embodiment, an entertaining video reel slot game called "Double Stampede Deluxe" provides a bonus round allowing the player to choose six animated cattle to realize additional credits. FIG. 3 displays a reel combination from "Double Stampede Deluxe" that triggers a bonus game. In this example, the display 12 reveals bonus symbols 30 on the first, second, and third reels along an active pay line. As will be appreciated by those with ordinary skill in the art, the manner in which the bonus is triggered can be determined by any combination of any number of bonus symbols as defined by the reel slot video game and presented in the pay table or game instructions.

Figure 4:
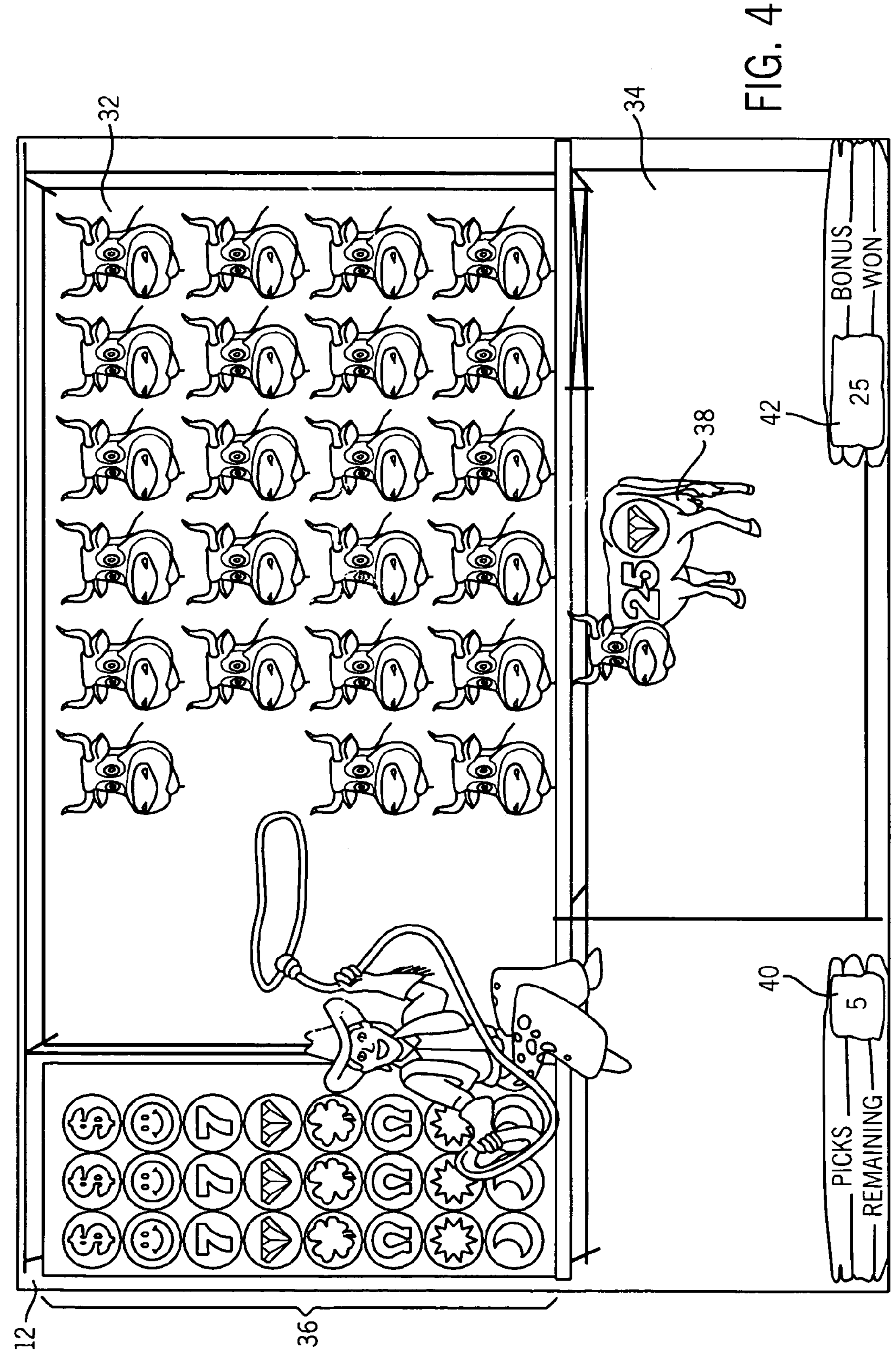
FIG. 4 is a display image showing a bonus round, a group of selectable objects or animated characters, a meter identifying the number of selections allowed to the player during the round, and an initial player selection.

Display 12 in FIG. 4 now allows the player to choose one of the bonus symbols (animated steer) from a "corral" 32. The player's choice is moved to a visual position, separating it to identify it as selected. In this example, the separate position is displayed as a "holding pen" 34. Display 12 also identifies the types of "brands" 36 associated with the animated steer and the number needed to complete a set. In this example, an animated steer 38 has been initially selected from "corral" 32 and placed in "holding pen" 34. The Steer 38 displays an animated "gem" brand that corresponds to one of the sets of available brands 36. Steer 38 also displays a credit amount that is added to a "Bonus Won" meter 42. A "Picks Remaining" meter 40 identifies to the player the number of remaining selections allowed during this bonus round. In this example, a total of six picks were allowed to the player when the bonus round started and after the initial pick (steer 38), five picks remain. The "Bonus Won" meter 42 identifies the total number of credits won based on adding the credits displayed on each steer in "holding pen" 34.

Figure 5:
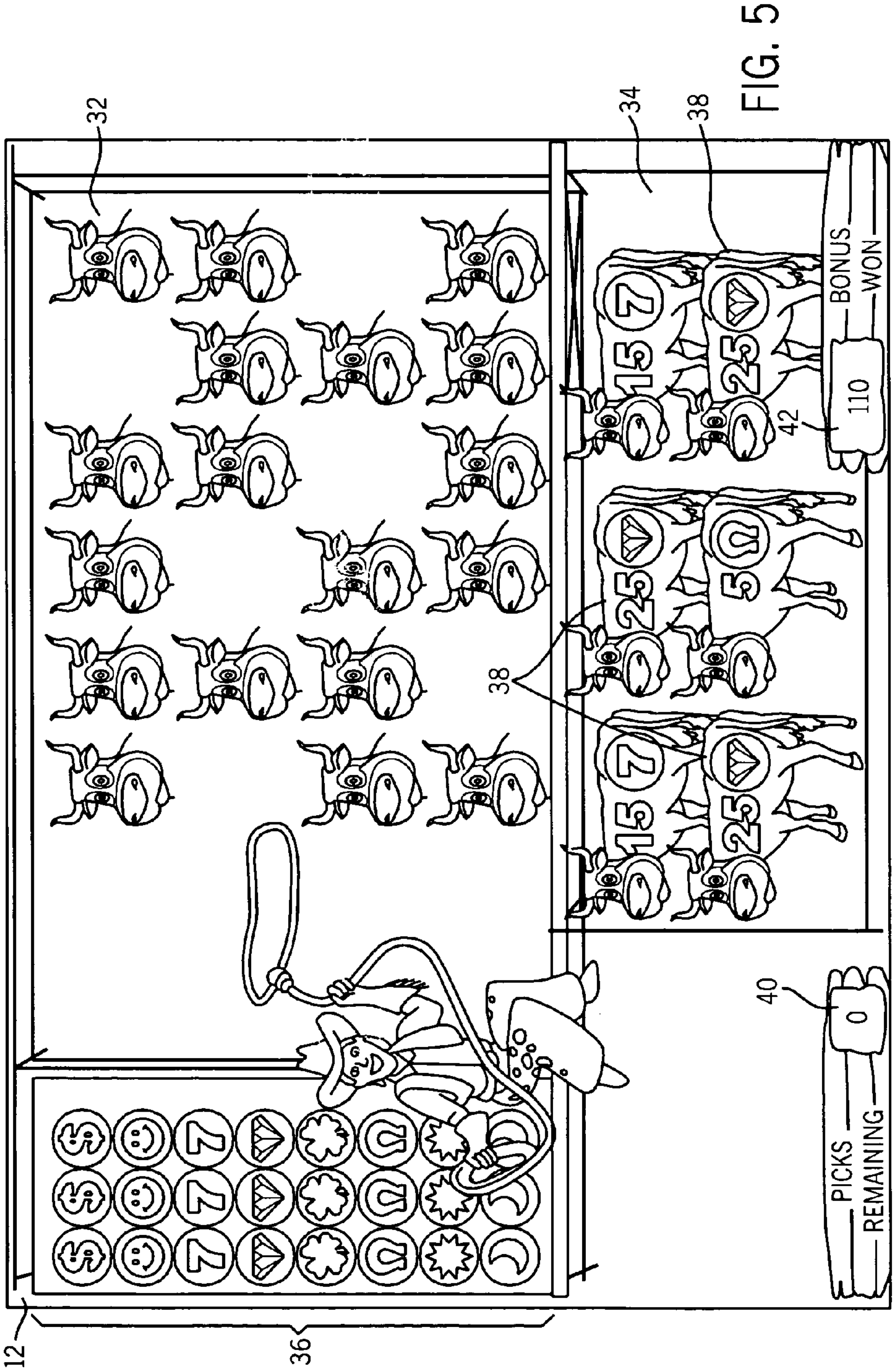
FIG. 5 is a display image showing the results of the bonus round after the player has selected the entire amount allowed.

FIG. 5 shows the results of all six of the player's choices. The player has chosen a matched set of animated steer 38 based on the animated "brand" displayed on each. The "Picks Remaining" meter now displays a zero indicating that all selections have been completed.

Figure 6:
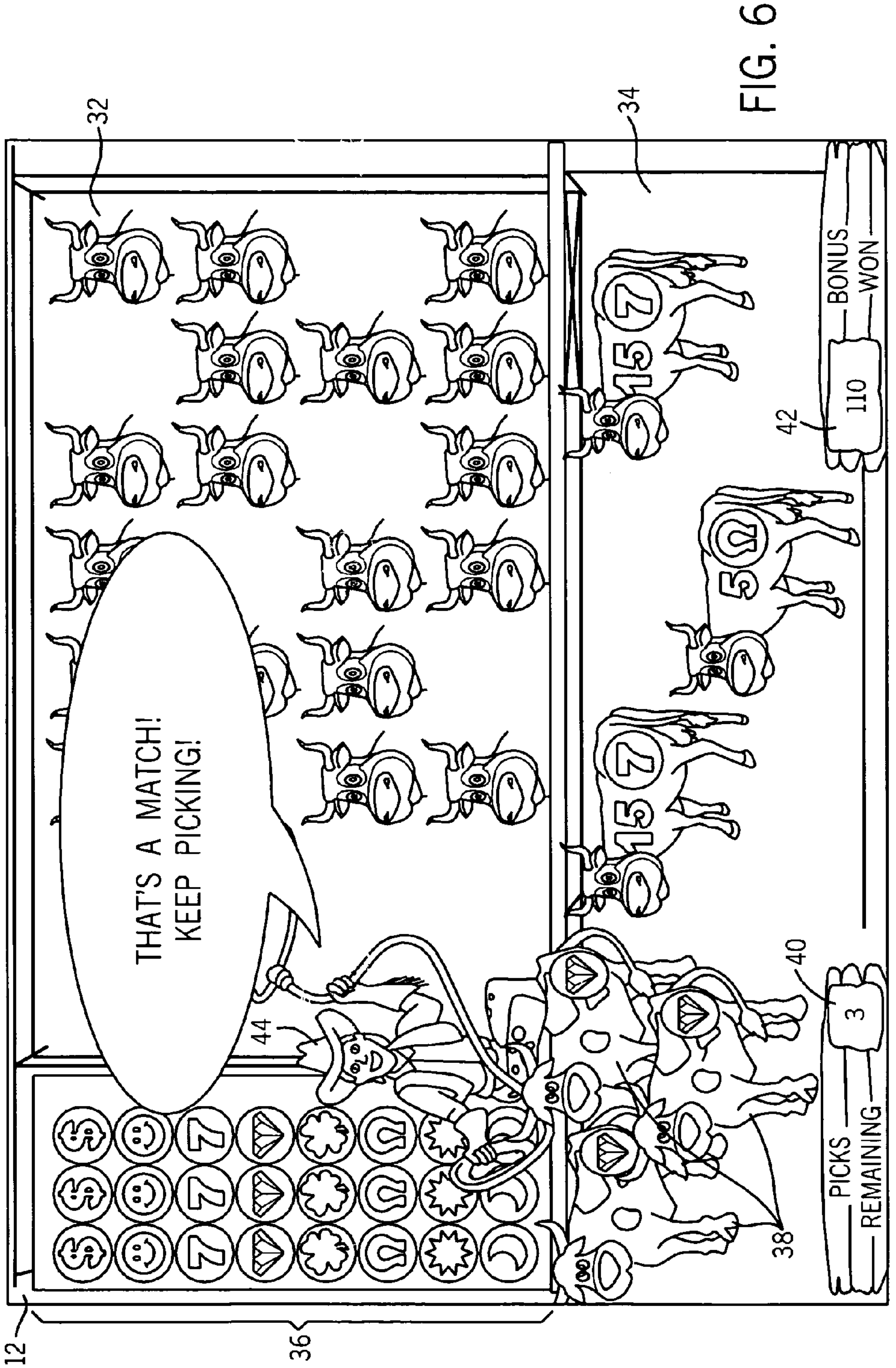
FIG. 6 is a display image showing a group of objects or animated characters identified as a set being gathered and moved from a predetermined collection area, allowing the player to continue playing the bonus round.

FIG. 6 shows the matched set of steer 38 moved from the "holding pen" 34. In this example, a set comprises three steer. Because the three steer 38 were moved from the "holding pen" 34, three additional spaces are available in the "holding pen" 34 allowing three additional picks from the "corral" 32 to the player. This is also represented on the "Picks Remaining" meter 40. An animated "cowboy" character 44 announces the completion of the set and the availability of additional picks to the player.

Figure 7:
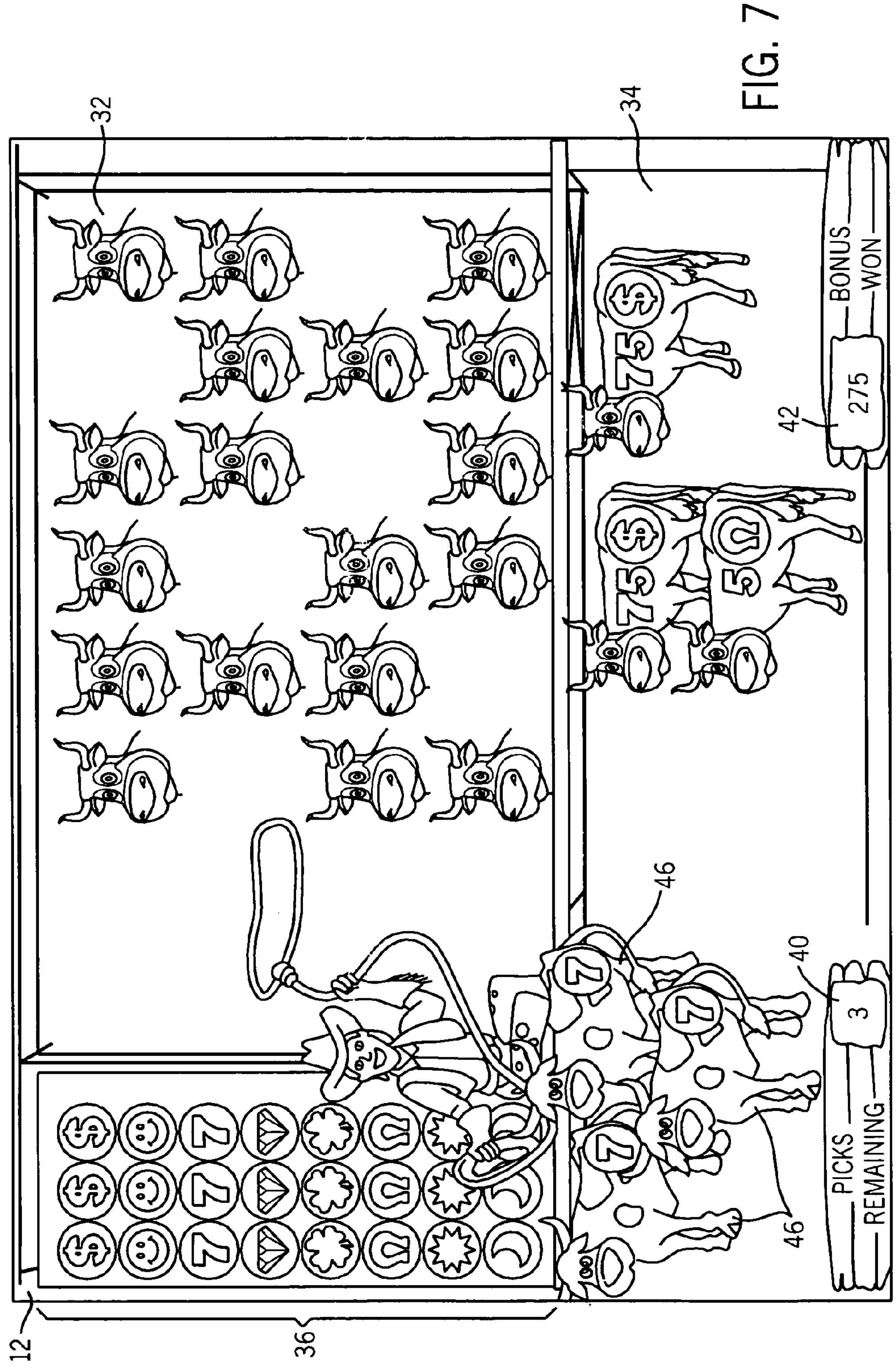
FIG. 7 is a display image showing another group of objects or animated characters identified as a set being gathered and moved from a predetermined collection area, allowing the player to continue playing the bonus round.

FIG. 7 shows another example of a matched set. As steer are selected from the "corral" 32, the "holding pen" 34 becomes "full". Credits revealed on selected steer are again added to the "Bonus Won" meter 42. Because the "brand" on three of the steer 46 in the "holding pen" 34 comprise a match, these steer are moved out of the "holding pen" 34 creating an additional three picks for the player. The bonus game continues in this manner until the "holding pen" 32 is full (without another completion of a matched set) or all of the steer have been selected from the "corral" 32.

Figure 8:
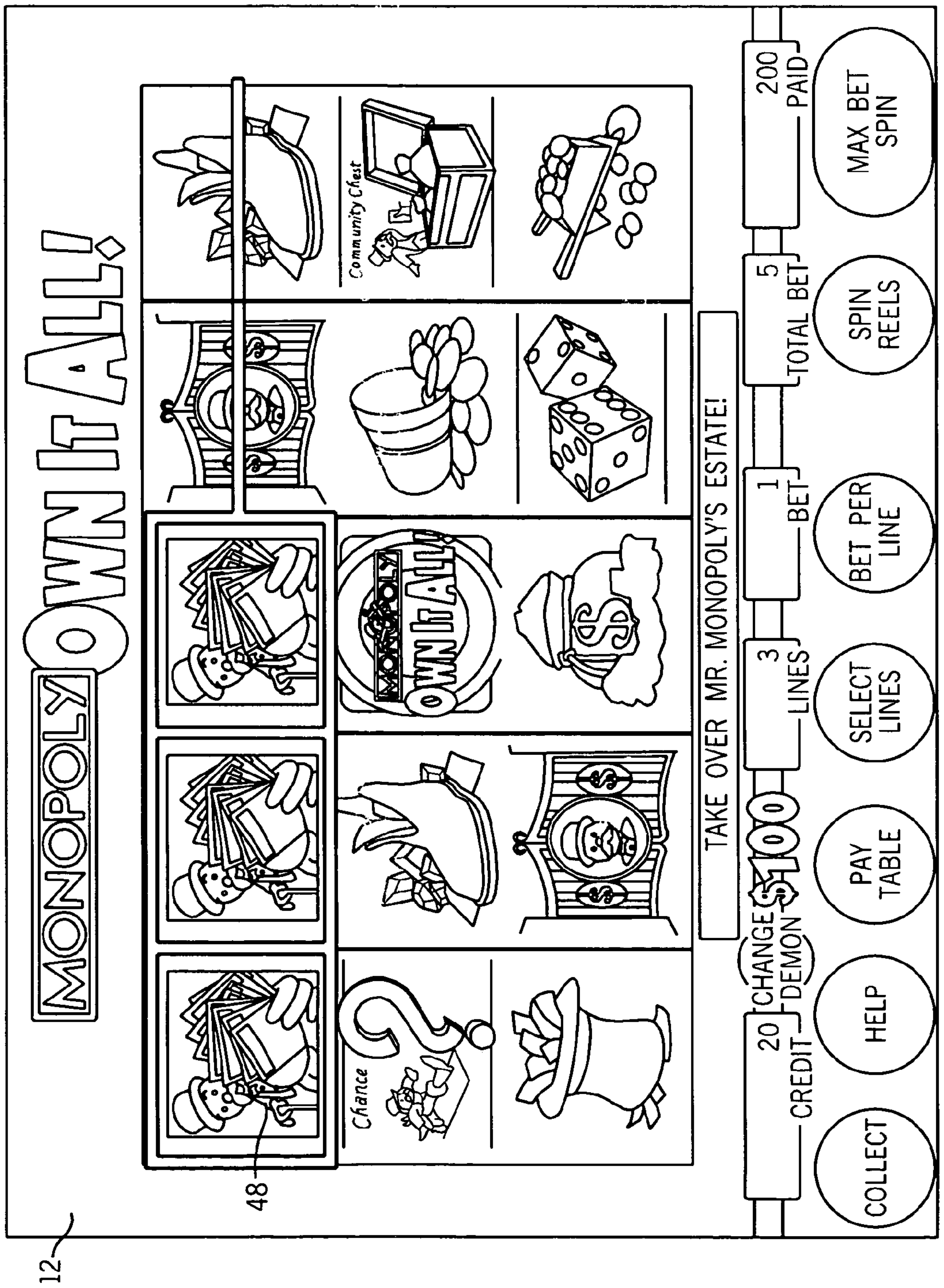
FIG. 8 is a display image associated with a basic slot game and showing a symbol combination for triggering a bonus feature.

Another embodiment of this invention is presented in the reel slot game "MONOPOLY Own It All". FIG. 8 is a display image of the basic reel slot game "MONOPOLY Own It All" showing a bonus triggering combination of animated reel images 48. As will be appreciated by those with ordinary skill in the art, the manner in which the bonus is triggered can be determined by any combination of any number of bonus symbols as defined by the reel slot video game and presented in the pay table or game instructions.

Figure 9A:
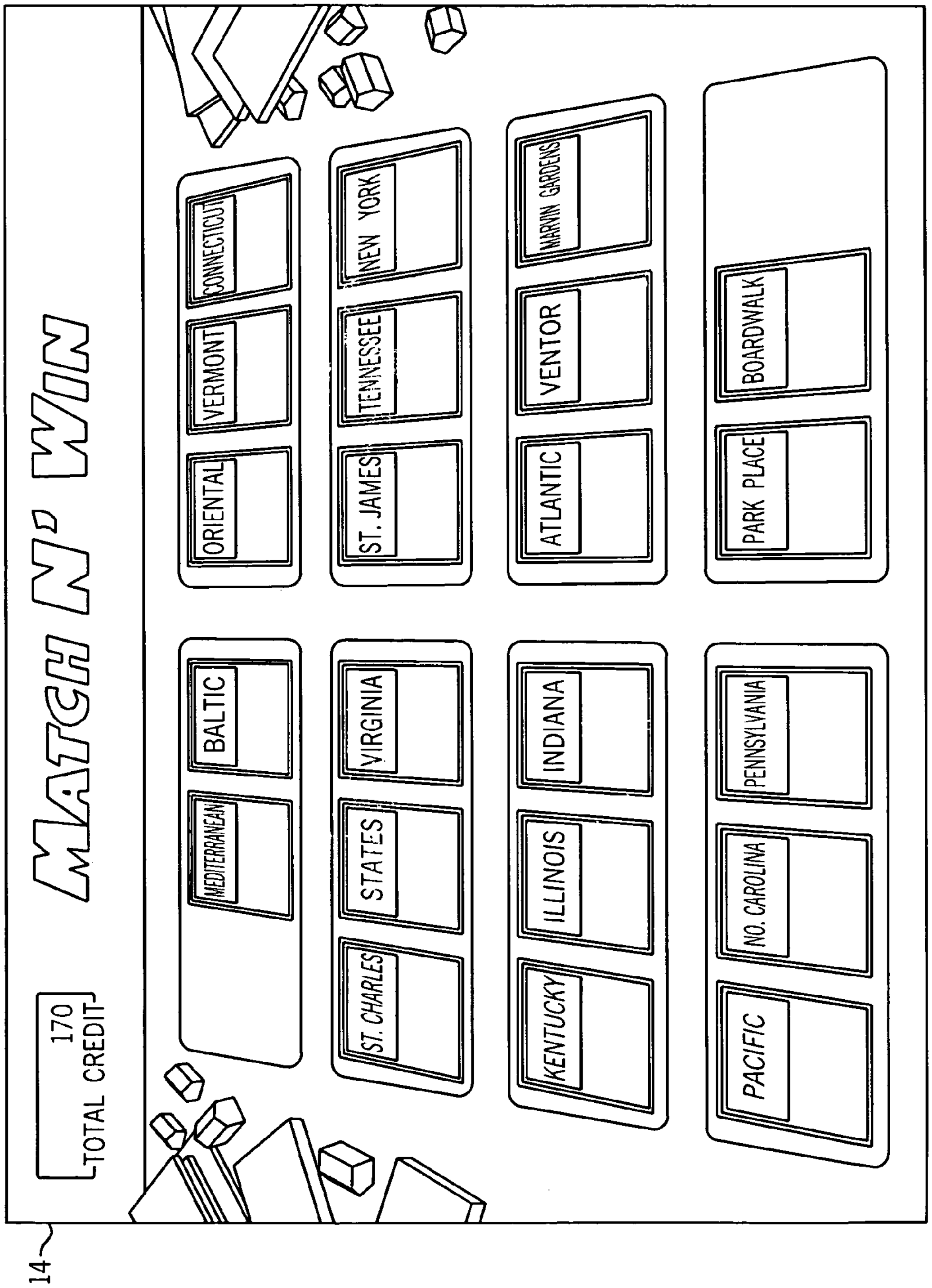
FIGS. 9*a* and 9*b* are display images of the top and bottom screens, respectively, of the gaming machine showing a bonus round allowing a player to make selections from a group of objects.
Figure 9B:
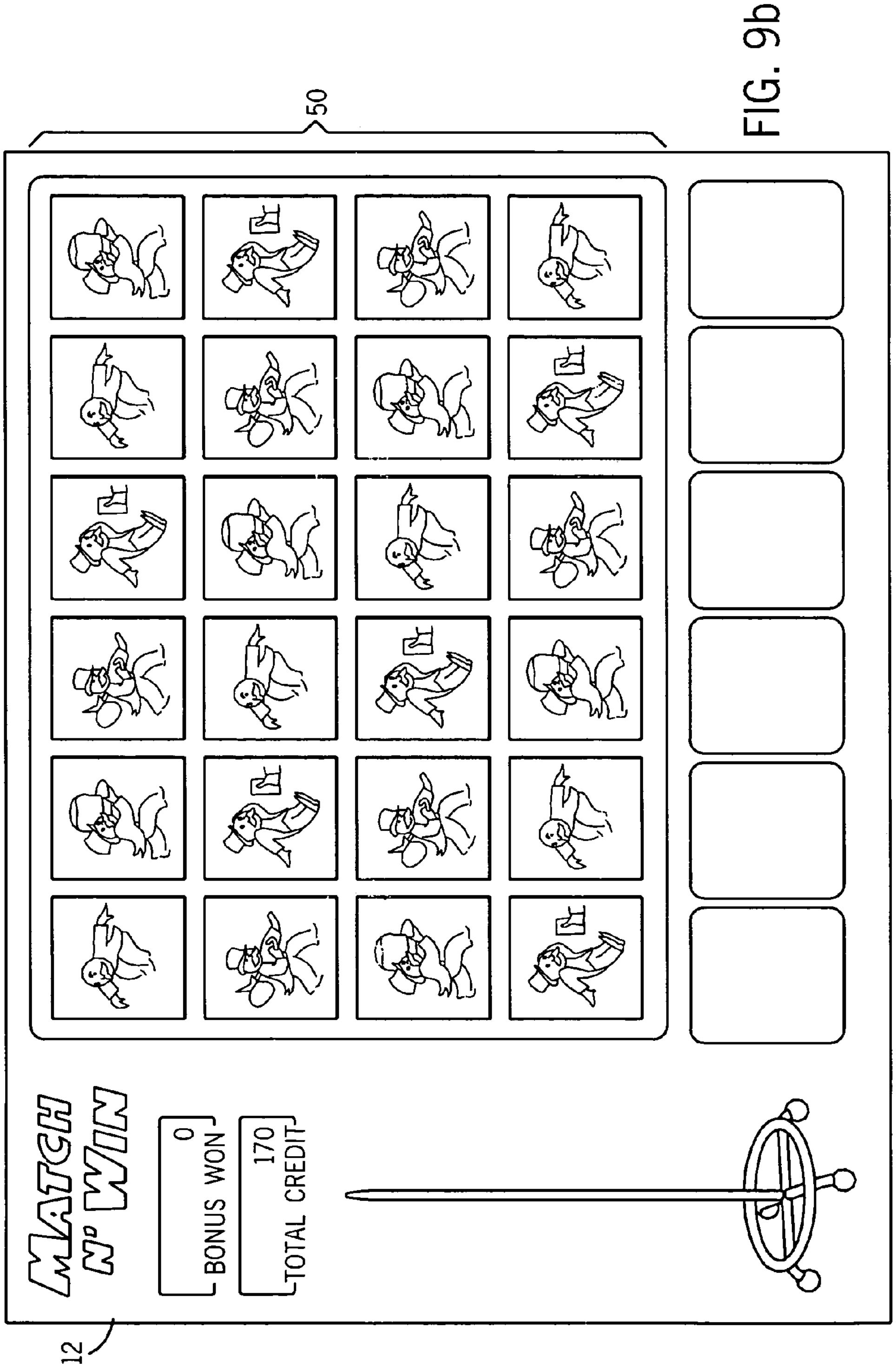

FIGS. 9*a* and 9*b* are presented simultaneously on top box display 14 and main game display 12, respectively. FIG. 9*a* displays the available objects in sets comprising the bonus game. In this example, the objects are property cards from the popular board game MONOPOLY. FIG. 9*b* shows the reverse side of all the property cards 50. The property cards 50 are randomly placed in a grid format.

Figure 10A:
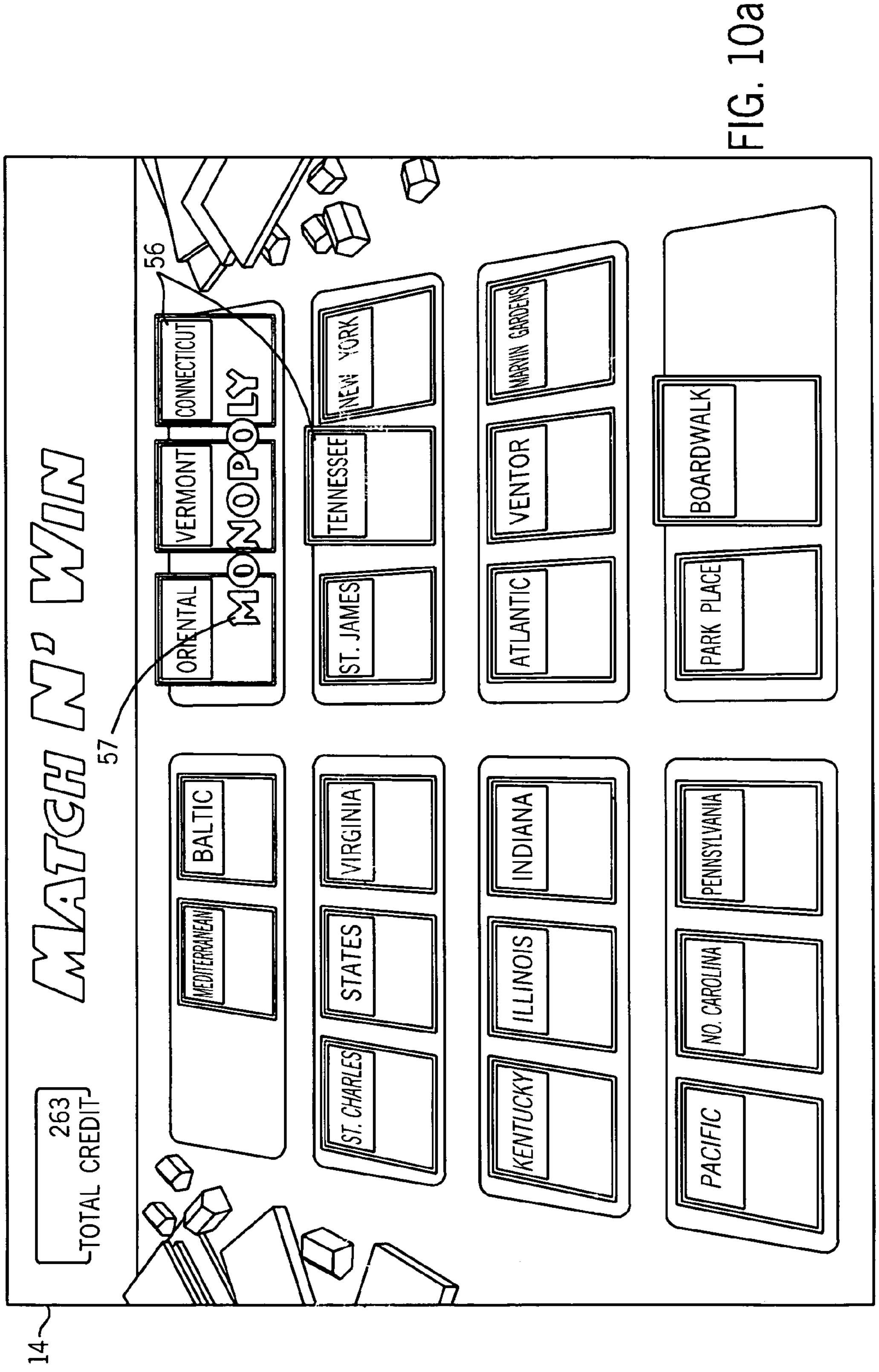
FIGS. 10*a* and 10*b* are display images of the top and bottom screens, respectively, of the gaming machine showing a group of objects identified as a set having been moved from a predetermined collection area.
Figure 10B:
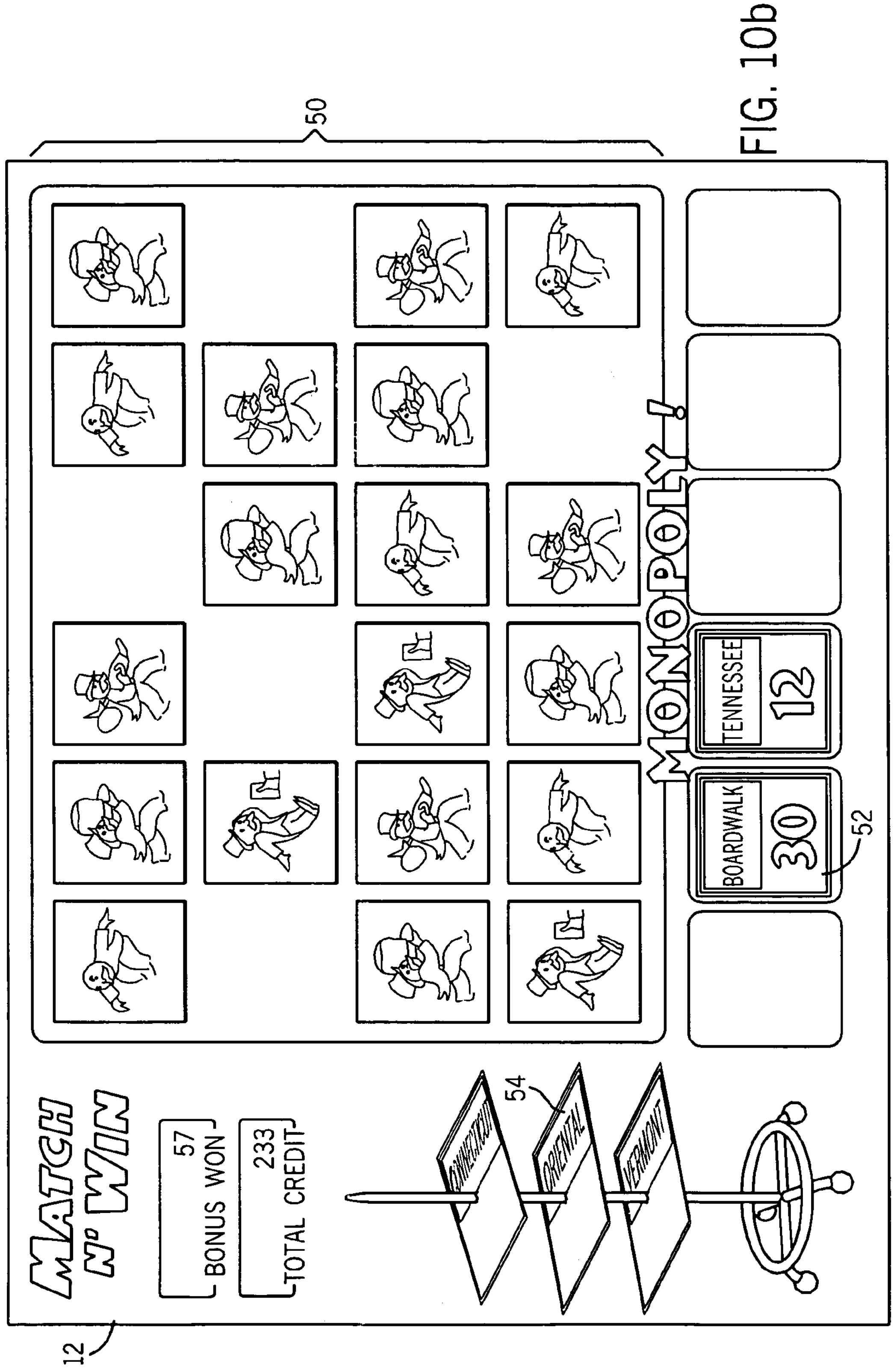

FIGS. 10*a* and 10*b* are presented simultaneously on top box display 14 and main game display 12, respectively. In this example, the player has begun selecting or picking property cards from the grid of cards on display 12. FIG. 10*a* is an image of display 14 showing all property cards with the player selected property cards 56 highlighted. Completed sets of property cards are identified with the word "MONOPOLY" 57. FIG. 10*b* displays the remaining available property cards 50, the selected property cards not forming a set 52 and an entertaining representation of the selected property cards forming a set 54. The selected set 54 was previously positioned with the other selected property cards 52 but have been moved freeing up three spaces and allowing three additional selections for the player. Credit values associated with each property card are displayed on the selected cards 52 and an accumulated value for all selected cards is displayed in a "Bonus Won" meter 57.

Figure 11A:
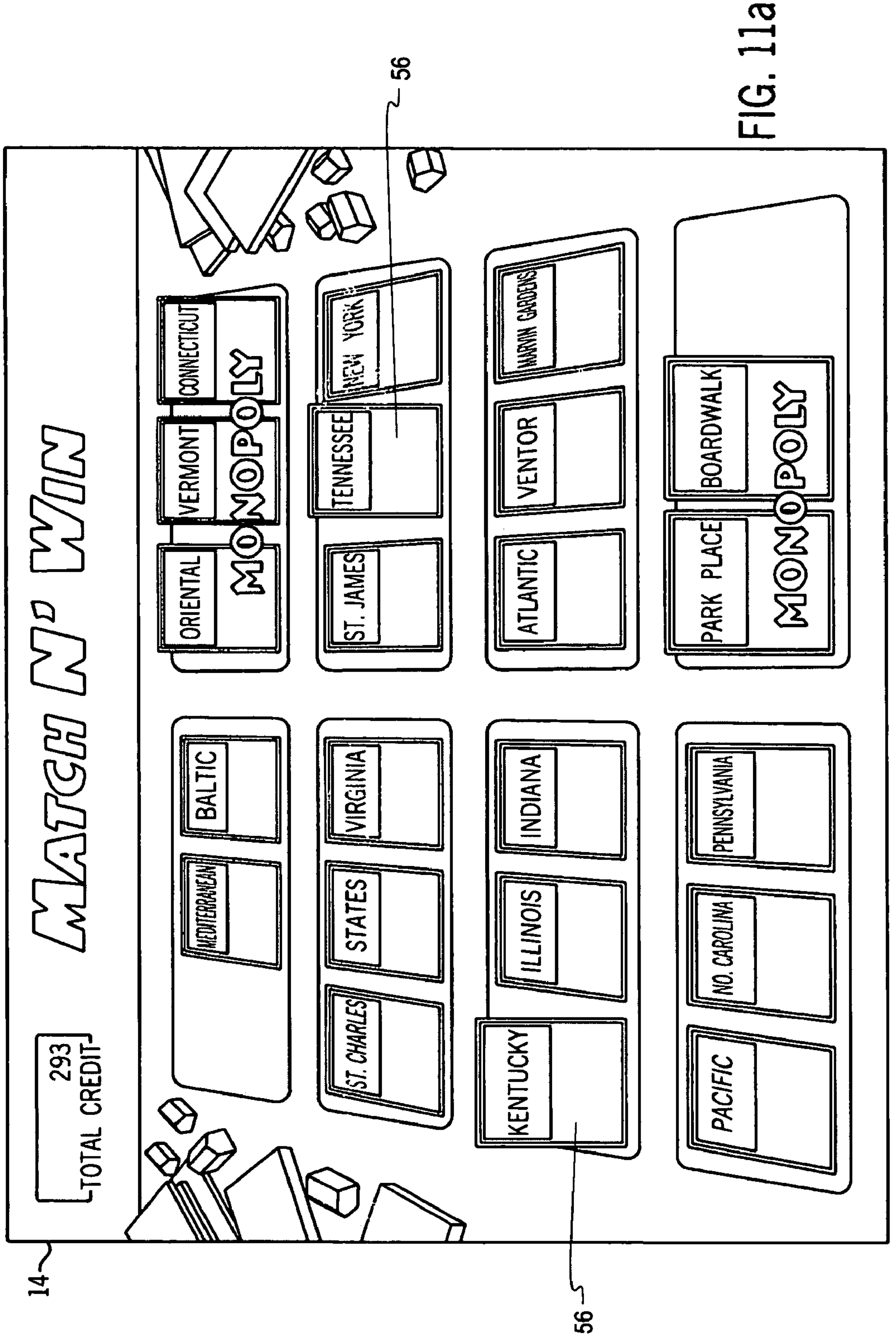
FIGS. 11*a* and 11*b* are display images of the top and bottom screens, respectively, of the gaming machine showing another group of objects identified as a set having been moved from a predetermined collection area.
Figure 11B:
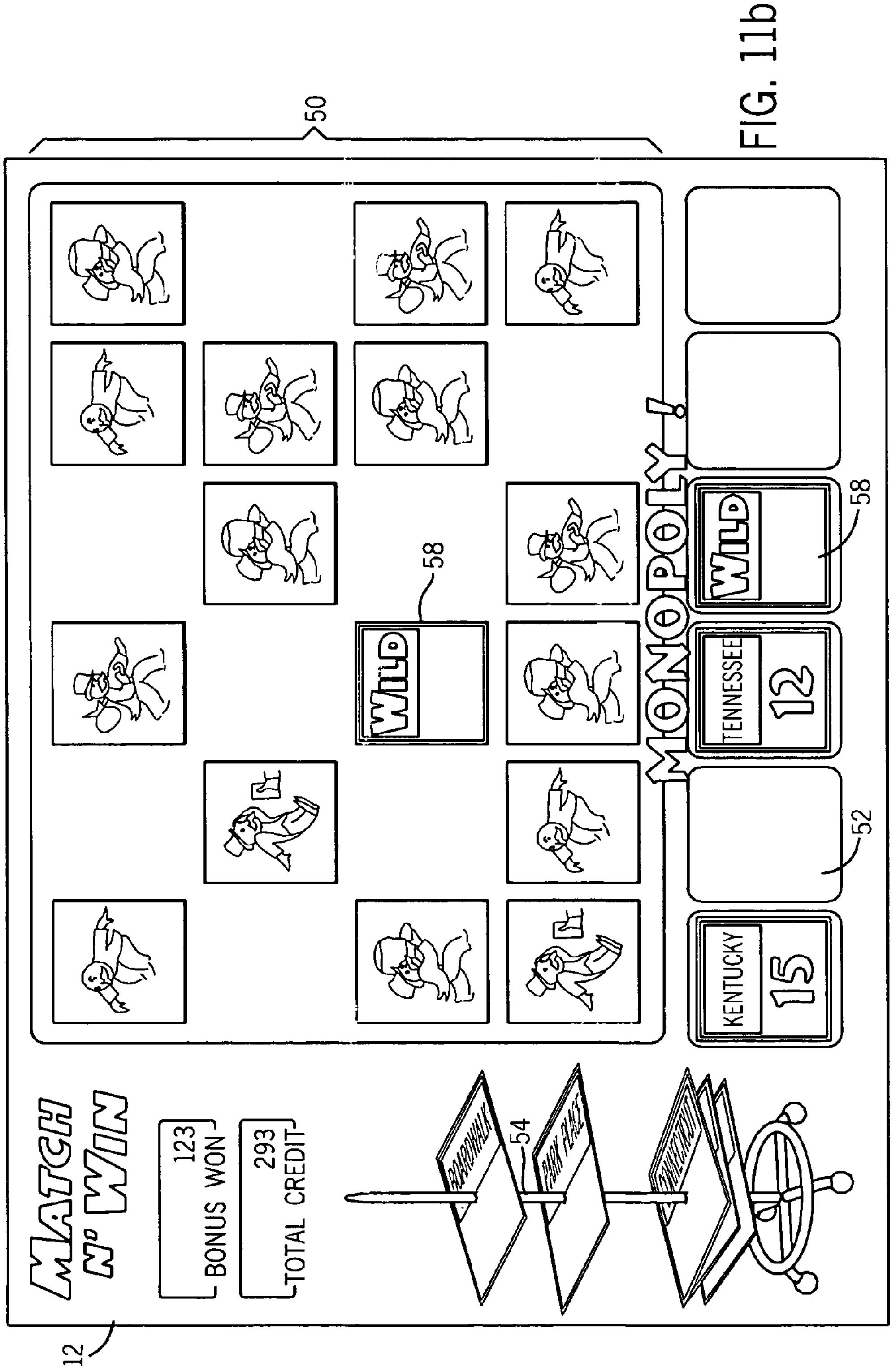

FIGS. 11*a* and 11*b* are presented simultaneously on top box display 14 and main game display 12, respectively. In this example, the player has continued selecting or picking property cards from the grid of cards on display 12. FIG. 11*a* is an image of display 14 showing all property cards with the player selected property cards 56 highlighted. FIG. 11*b* displays the remaining available property cards 50, the selected property cards not forming a set 52 and an entertaining representation of another set of selected property cards 54. The selected set 54 was previously positioned with the other selected property cards 52 but has been moved freeing spaces and allowing additional selections for the player. In a variation to the matched set, "wild" cards are also available. FIG. 11*b* shows a "wild" card 58 being selected. A "wild" card in addition to other like property cards can complete sets.

While the present invention has been described with reference to one or more particular embodiments, those skilled in the art will recognize that many changes may be made thereto without departing from the spirit and scope of the present invention.

For example, the number of objects comprising a set may vary depending on the math table and entertainment requirements of the game. The number of sets needed to free up additional selections may also vary. Another variation is a method for providing an unlimited number of selectable objects and limiting the time allowed to make selections to create sets. The number of objects available with like characteristics in the selectable group of objects may be more than the number required to create a group. For instance, there may be four or more like objects in a selectable group but only three are required to make a set. Awards presented can vary from credits to free reel spins to multipliers. The number of added selections can also vary such that any set created, no matter how many objects are required to create that set, can provide any number of additional selections including a varied number.

Each of these embodiments and obvious variations thereof is contemplated as falling within the spirit and scope of the claimed invention, which is set forth in the following claims.

What is claimed is:

1. A method of conducting a wagering game, comprising:

providing a processor programmed for performing the steps of:

(i) causing a plurality of selectable elements to be displayed in a predefined display area, each of the selectable elements being displayed so as to initially conceal indicia associated with the selectable element and then reveal the associated indicia in response to being selected by the player;

(ii) accepting the selection of a fixed number of the selectable elements less than the total number of selectable elements, wherein a first selected element is not required to have a predefined association with another one or more of the selected elements in order to continue the selecting, all of the selections occurring during the play of the wagering game and prior to entering an additional wager input to engage in another play of the wagering game;

(iii) removing the selected elements from the predefined display area and placing the selected elements in a storage display area that is capable of holding a maximum amount of selected elements less than the total number of selectable elements such that the selected element is no longer available for selection;

(iv) determining if selected elements within the storage display area are matching, and providing an award based on the matching selected elements and removing the matching elements from the storage display area; and (v) continuing the accepting of selections of the selectable elements and continuing the removing and providing of steps (iii) and (iv) until the maximum amount of selected elements is achieved in the storage display area with no matching selected elements.

2. The method of claim 1, further including revealing indicium associated with the selected elements.

3. The method of claim 1, wherein the step of accepting the selection is responsive to player input.

4. The method of claim 1, wherein the selectable elements are displayed in the predefined area on one section of a video display and the storage display area is simultaneously displayed on another section of the video display.

5. The method of claim 1, further including conducting a base game and triggering a bonus game in response to a special outcome in the base game, the bonus game including the steps (i) to (v).

6. The method of claim 5, wherein the base game includes a plurality of symbol-bearing reels that are rotated and stopped to place symbols on the reels in visual association with a display area.

7. The method of claim 1, wherein the matching elements include a color match.

8. A method of conducting a wagering game, comprising:
providing a processor programmed for performing the steps of:
causing a plurality of selectable elements to be displayed in a predefined selection region of a display, each of the selectable elements being displayed so as to initially conceal indicia associated with the selectable element and then reveal the associated indicia in response to being selected by the player;
accepting the selection of a first number of the selectable elements less than the total number of selectable elements;
revealing indicia associated with the selected elements and removing the selected element from the predefined storage area and placing the selected elements in a storage region of the display, wherein the storage region is configured to hold a maximum number of selected elements less than the total number of selectable elements;
determining if the selected elements form, in the storage region, a first predefined set as indicated by the revealed indicia, and if the selected elements form the first predefined set, accepting the selection of, the second number corresponding to the number of elements in the first predefined set, the selections associated with the first number and the second number occurring during the play of the wagering game and prior to entering an additional wager input to engage in another play of the wagering game;
providing an award based on the selected elements in the first predefined set;
revealing indicia associated with the selected elements from the second number of selected elements and moving the selected elements to the storage region of the display; and
determining if the selectable elements from the second number of selections in the storage area form a second predefined set with one or more selectable elements from the first number of selections that did not form the first predefined set, and if the selectable elements from the second number of selections form the second predefined set with one or more selectable elements from the first number of selections that did not form the first predefined set, providing an award based on the selected elements in the second predefined set.

9. A method of conducting a wagering game, comprising:
providing a processor programmed for performing the steps of:
receiving a first wager input from a player to engage in a play of the wagering game;
causing a plurality of selectable elements to be displayed in a predefined selection area on a display, each of the selectable elements being displayed so as to initially conceal indicia associated with the selectable element and then reveal the associated indicia in response to being selected by the player, the selectable elements concealing at least one matching indicium for every available indicium that is concealed;
causing to be displayed a storage area capable of accommodating a maximum number of the elements less than the total number of selectable elements;
accepting the selection of the selectable elements from the selection area and revealing the associated indicium after selection;
removing the selected elements from the selection area and placing the selected elements into the storage area until the storage area is filled with the maximum number of elements;
removing from the storage area any of the selected elements that form a predefined set based on matching indicium;
prior to entering a second wager input to engage in another play of the wagering game, adding additional selected elements to the storage area, the number of additional selected elements corresponding to the number of selected elements that are removed from the storage area; and
providing an award based on the predefined sets of selected elements that are removed from the storage area.

10. An apparatus for conducting a wagering game, comprising:
a display for displaying a plurality of selectable elements and having a selection region and a storage region, each of the selectable elements being displayed in the selection region of the display so as to initially conceal indicia associated with the selectable element, each of the selected ones of the plurality of selectable elements are moved to the storage area on the display and the associated indicia is revealed in response to being selected by the player, wherein the storage area is configured to hold a maximum number of the selected elements less than the total number of selectable elements; and
a controller coupled to the display and operative to receive a first wager input;
receive a fixed number of selections of the selectable elements less than the total number of selectable elements;
cause the display to reveal the concealed indicia and remove the selected elements from the selection region and placing the selected elements in the storage area;
determine if the selected elements form a first predefined set in the storage area, and award an additional number of selections of the selectable elements if the selected elements form the first predefined set;
receive the additional number of selections of the selectable elements the selections being received during the play of the wagering game and prior to receiving a second wager input to engage in another play of the wagering game;
cause the display to reveal the concealed indicia and move the selected elements from the additional number of selections to the storage area;
compare the selected elements from the additional number of selections with the selected elements from the fixed number of selections that did not form the first predefined set to determine if a second predefined set is formed; and
provide an award based on the selected elements forming the first predefined set and the second predefined set.

11. The apparatus of claim 10, wherein the controller is operative to select the selectable elements in response to player input.

12. The apparatus of claim 10, wherein the controller is operative to provide an award for each predefined set formed by the selected items.

13. The apparatus of claim 10, further including conducting a base game and triggering a bonus game in response to a special outcome in the basic game, wherein the display is operative to display the plurality of selectable elements and the controller is operative to receive the first wager input, receive the fixed number of selections, award the additional number of selections, receive the additional number of selections, compare the selected elements and provide the award during the bonus game.

14. The apparatus of claim 13, wherein the base game includes a plurality of symbol-bearing reels that are rotated and stopped to place symbols on the reels in visual association with a display area.

15. The apparatus of claim 10, wherein the predefined set is formed by matching indicium of like color, shape, name, or other visual aspect.

16. A computer-readable medium encoded with a program for implementing a method, said program for directing a device to perform the steps of:

receiving a first wager input from a player to engage in a play of a wagering game;

displaying a plurality of selectable elements in a predefined display area, each of the selectable elements being displayed so as to initially conceal indicia associated with the selectable element and then reveal the associated indicia in response to being selected by the player;

receiving the selection of a fixed number of the selectable elements less than the total number of selectable elements;

removing the selected elements from the predefined display area and placing the selected elements in a storage region of the display, wherein the storage region is configured to hold a maximum number of selected elements less than the total number of selectable elements;

determining if the selected elements form a first predefined set in the storage region, and if the selected elements for the first predefined set awarding an additional number of selections of the selectable elements, the selections of the fixed number and the additional number of selections occurring during the play of the wagering game and prior to entering a second wager input to engage in another play of the wagering game;

moving the selected elements from the additional number of selections to the storage region of the display such that they are no longer available for selection;

combining the selected elements from the additional number of selections with at least a portion of the selected elements from the fixed number of selections that did not form the first predefined set and determining whether the combined selected elements form a second predefined set; and providing an award based on the selected elements forming the first predefined set and the second predefined set.

17. The method of claim 8, wherein the indicia include a first indicium and a second indicium.

18. The method of claim 17, wherein the first indicium is associated with forming the at least one predefined set.

19. The method of claim 17, wherein the second indicium is associated with providing the award based on the selected elements, the award being determined by a value of the second indicium associated with each of the selected elements.

20. A method of conducting a wagering game via an electronic gaming terminal, comprising:

providing a processor programmed for performing the steps of:

causing to be displayed, on a display of the electronic gaming terminal, a first area and a second area, the first area including a plurality of player-selectable elements associated with respective indicium initially concealed from a player, the second area being capable of accommodating a maximum number of selected elements less than the total number of selectable elements;

receiving successive selections from the player of particular elements from the plurality of player-selectable elements the successive selections including a number of selectable elements less than the total number of selectable elements;

revealing the indicium associated with each selected element;

removing each selected element from the plurality of player-selectable elements from the first area such that the first area no longer includes the selected element;

adding each selected element to the second area;

removing, from the second area, selected elements having matching revealed indicium;

continuing to receive the successive selections until the maximum number of selected elements occupy the second area without any selected elements within the second area having matching revealed indicia; and providing an award associated with the matching ones of the selected elements.

21. The method of claim 20, wherein the first area and the second area are displayed simultaneously.

22. The method of claim 21, wherein the removing each selected element from the first area and adding each selected element to the second area includes moving the selected element with animation from the first area to the second area.

23. The method of claim 20, wherein the wagering game includes a base game and a bonus game, the bonus game including the acts of displaying, receiving, revealing, removing, adding, removing, continuing and providing.

24. The method of claim 20, wherein the matching indicium include a color match.

25. The method of claim 20, wherein the acts of displaying, receiving, revealing, removing, adding, removing, continuing and providing are conducted in the recited sequence.

26. The method of claim 20, wherein the removing, from the second area, the selected elements having matching revealed indicium requires three selected elements having matching revealed indicium.

27. The method of claim 20, wherein the selectable elements conceal at least one matching indicium for every available indicium that is concealed.

28. The method of claim 20, further including, displaying, on a display of the electronic gaming terminal, a third area in which the selected elements having matching revealed indicium are displayed after being removed from the second area.

29. The method of claim 28, wherein the first area, the second area, and the third area are displayed simultaneously.

* * * * *

UNITED STATES PATENT AND TRADEMARK OFFICE

CERTIFICATE OF CORRECTION

PATENT NO. : 7,628,690 B2
APPLICATION NO. : 10/778574
DATED : December 8, 2009
INVENTOR(S) : Allon G. Englman et al.

It is certified that error appears in the above-identified patent and that said Letters Patent is hereby corrected as shown below:

In Column 7, Claim 8, Lines 31-40, please replace with the following:

-- determining if the selected elements form, in the storage region, a first predefined set as indicated by the revealed indicia, and if the selected elements form the first predefined set, accepting the selection of a second number of selectable elements, the second number corresponding to the number of elements in the first predefined set, the selections associated with the first number and the second number occurring during the play of the wagering game and prior to entering an additional wager input to engage in another play of the wagering game; --

Signed and Sealed this

Ninth Day of February, 2010

David J. Kappos
*Director of the United States Patent and Trademark Office*

UNITED STATES PATENT AND TRADEMARK OFFICE

CERTIFICATE OF CORRECTION

PATENT NO. : 7,628,690 B2
APPLICATION NO. : 10/778574
DATED : December 8, 2009
INVENTOR(S) : Englman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1260 days.

Signed and Sealed this

Second Day of November, 2010

David J. Kappos

*Director of the United States Patent and Trademark Office*